LOCAL AND REMOTE EXCHANGE TIMED METERING

Filed June 21, 1950 6 Sheets-Sheet 1

INVENTOR.
CLARENCE E. LOMAX
BY
Chas. W. Conly
ATTORNEY

LOCAL AND REMOTE EXCHANGE TIMED METERING

Filed June 21, 1950 6 Sheets-Sheet 2

INVENTOR.
CLARENCE E. LOMAX
BY
ATTORNEY

INVENTOR.
CLARENCE E. LOMAX
BY
[signature]
ATTORNEY

INVENTOR.
CLARENCE E. LOMAX
BY
ATTORNEY

Nov. 22, 1955 C. E. LOMAX 2,724,741

LOCAL AND REMOTE EXCHANGE TIMED METERING

Filed June 21, 1950 6 Sheets-Sheet 5

INVENTOR.
CLARENCE E. LOMAX

BY Chas. Wm. Candy

ATTORNEY

LOCAL AND REMOTE EXCHANGE TIMED METERING

Filed June 21, 1950 6 Sheets-Sheet 6

INVENTOR.
CLARENCE E. LOMAX
BY Chas. W. Candy
ATTORNEY

United States Patent Office 2,724,741
Patented Nov. 22, 1955

2,724,741

LOCAL AND REMOTE EXCHANGE TIMED METERING

Clarence E. Lomax, Chicago, Ill., assignor to Automatic Electric Laboratories, Inc., Chicago, Ill., a corporation of Delaware Application June 21, 1950, Serial No. 169,444

13 Claims. (Cl. 179—7.1)

This invention relates in general to automatic telephone systems and more particularly to trunk circuits for local and remote exchange timed metering in such systems.

An object of the invention is the provision of an improved local and remote timed metering means for use in a branch office of a multi-office network where the short distance toll lines between offices terminate in the main office and where toll lines are accessible thru inter-office trunks.

A feature of the invention resides in the metering of local calls as well as toll calls with the rates varying per unit time during different times of the day to induce subscribers to postpone calls until after the busy period of the day as well as an automatic alteration of the charge rate for overtime periods.

Another feature of the invention is the provision of means to improve pulsing, particularly over long trunk lines.

Still another feature of the invention in keeping with the above mentioned features is the provision of circuit means permitting direct dialing of short distance toll calls.

These and other objects and features will be more particularly pointed out in the ensuing specification taken in conjunction with the accompanying drawings in which:

Fig. 1 shows circuits and equipment used in the primary trunk to meter local calls.

Figs. 2 and 3 disclose an inter-office trunk repeater for short haul toll calls and the toll timer as well as a mechanical pulse repeater.

Figs. 1, 2, 3, 6, 7 represent equipment in a branch exchange while Figs. 4 and 5 represent main exchange equipment. The figures are arranged in numerical order left to right with Figs. 6 and 7 below Fig. 1.

Figure 1:
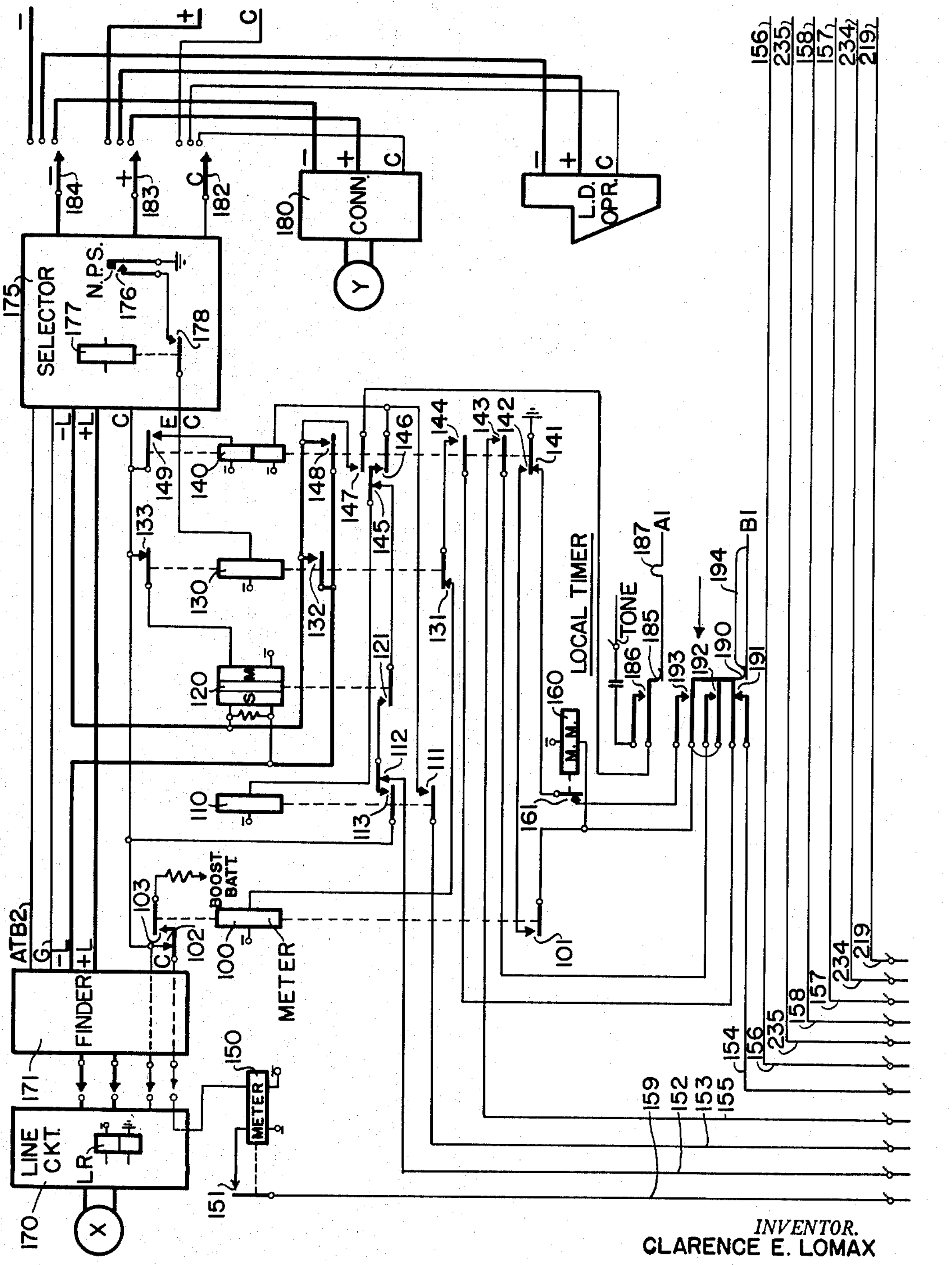

Briefly, the invention relates to an automatic telephone system wherein subscribers may directly dial suburban or nearby toll areas rather than calling and having the operator manually ticket the call. In this system, means are provided for metering all local and short distance toll calls automatically. Means are further provided for automatically varying the rate per time unit or varying the time unit from the first basic time period to the overtime or successive time periods after the initial period. Furthermore, the time periods may be extended during certain off peak load times of day to encourage calls to be made at such times after the busy business peak load hours; and likewise, in this manner, if advisable, local calls might be completely unmetered, say during late evening hours.

A detailed description now follows.

*Local call*

It will be assumed that subscriber X in a branch exchange desires to converse with subscriber Y in the same branch exchange. When X lifts his handset, the calling line loop is closed in well-known manner thru the hookswitch springs, not shown, at the substation X. The finder associated with X finds the calling line in equally well-known manner. The line being thus seized, ground is placed upon lead C at the finder from the associated selector 175 in the well known manner. This ground over lead C is traced thru contact 133 on relay 130 and thru the right-hand (M) coil of shunt field relay 120 to battery. The S coil of relay 120 also has current flowing therethru over the —L line of the loop circuit. However, relay 120 is poled so as not to operate until the current is reversed thru coil S. Meter magnet 150 is marginally adjusted so that it will operate only from booster battery and therefore ground on the C lead on seizure of selector 175 does not operate meter 150. Selector 175 is now dialled. Of course, it is understood that only one group of first selectors, such as selector 175, may be used depending upon the size of the exchange. For simplicity, it will be assumed that only one selector, 175 is employed. First digits from 2 to 9 are assigned for local calls. Digits 1 and 0 are for other purposes to be described later. Suffice it to say here that normal post springs 176 in selector 175 do not operate on digits 2–9. The call is extended to an idle connector 180 in well-known manner so that the second and third digits step the connector to line Y which terminates on its bank contacts.

Figures 6, 7:
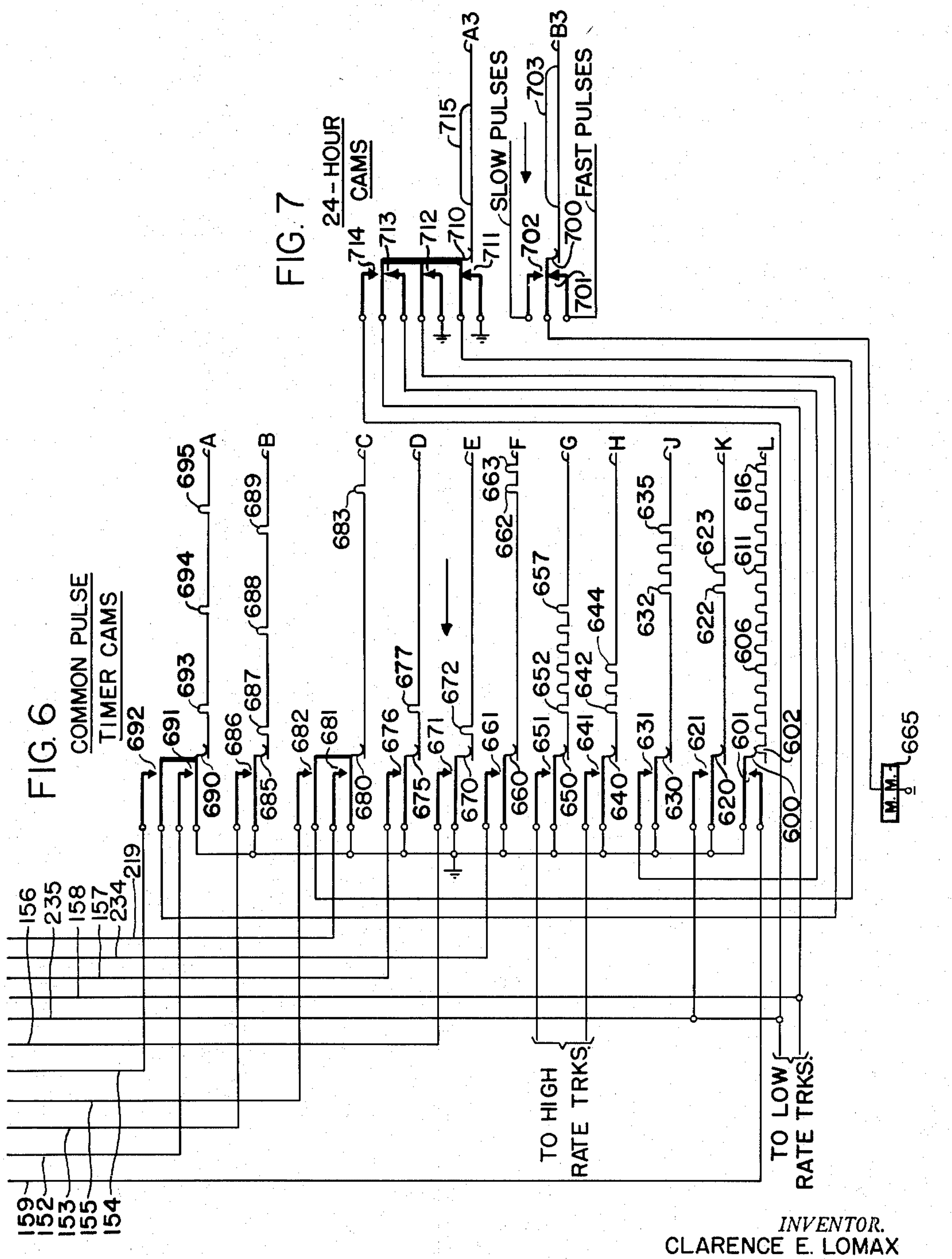
Fig. 6 is the timing and metering cam equipment common to both the branch and main exchange.
Fig. 7 is the timing cam means rotatable once in 24 hours for altering the local call time periods per unit rate during the day and for changing toll charges.

When subscriber Y answers, the current is reversed by the back bridge relay in the connector in equally well-known manner which in turn reverses current in coil S to operate relay 120. In operating relay 120 closes contact 121. Meanwhile motor magnet 665 in Fig. 6 is being pulse-stepped from the fast pulse source in Fig. 7 thru contact 701 to rotate a series of common metering cams, A—L. Cam A, at hump 693 operates arm 690 to make contacts 691 and 692. A pulse is sent from ground, common to all cam arms A—L, thru contact 691 over conductor 152, contacts 112, 121, 145 and winding of relay 110 to battery. Relay 110 in operating closes contact 113 and locks to ground therethru on lead C. A short time later, cam B at hump 688 raises arm 685 to make contact with 686 which in turn sends a pulse from ground therethru over conductor 153, thru contacts 111 and lower winding of relay 140 to battery. Relay 140 operates and in closing contact 149 locks via its upper winding therethru to ground on lead C. Relay 140 also opens the pulse path from cam A to relay 110 at contact 145 causing relay 110 to release and opens contact 111 so that subsequent pulses from cam B can no longer reach relay 140; and closes contact 148 to shunt coil S of relay 120 for better transmission.

Shortly after relay 140 has operated, another hump on cam A now sends a pulse from ground thru contact 692 over conductor 154 and thru contacts 191, now closed contact 144 on relay 140, contact 131 and winding of meter relay 100 to battery. Relay 100 operates and closes contact 103 to send booster battery over the obvious circuit thru the right-hand operate winding of meter 150 to exchange battery thereby operating the meter; and in closing contact 101 the motor magnet 160 of the local call conversational timer is grounded, the circuit being traced from ground thru contacts 142 and 101, thru winding of motor magnet 160 to battery. The timer mechanism is of the type which advances by retractile spring after the end of the pulse so that at the end of the pulse due to a hump on cam A, relay 100 restores ending the ground pulse to motor magnet 160 at which time it advances one step. As the magnet advances, elongated hump 194 of cam B1 via arm 190 opens contact 191 so that relay 100 cannot again operate from pulses derived from cam A until the full length of cam hump 194 (B1) has passed which determines the length of the original metering period.

The cams in Fig. 6 are moved on a step by step basis and the pulses which determine the speed at which they rotate are taken thru contacts 701 or 702 in Fig. 7 from the fast or slow pulse sources respectively. Either of two speeds of pulses can be used so that the speed of the cams in Fig. 6 may be varied during the 24 hour period. For example, fast speed may be used during the working day and slow speed during the remainder of the day. This provides a more or less rapid meter period per unit rate during the busy working day traffic period.

Cams A and B are arranged to send several pulses per revolution. A larger number of pulses is used so as not to unduly delay metering between pulses. Cam C sends only one pulse per revolution and this pulse steps motor magnet 160 in Fig. 1 to advance the local call conversational timer cams. The stepping circuit to magnet 160 is traced from ground thru contacts 711 in Fig. 7, contact 682, conductor 155, contacts 143, 192 and winding of motor magnet 160 to battery. It will be seen that this pulsing is not effective until relay 100 has stepped one step so as to have advanced the timer off its normal or home position. Cam C sends only one pulse per revolution. Any more pulses per revolution would necessitate an undue number of steps for the conversation timers to make to time a conversation, with resultant excessive wear.

In this manner, the local timer cams in Fig. 1 continue to advance, and if the conversation is of sufficiently long duration, cam A1 in advancing will momentarily apply a tone thru contact 186 to warn the parties that the call is again to be metered if they do not disconnect shortly. Should the conversation continue, the timer will soon reach its home position. At this time cam B1 again operates its arm 190, the end of hump 194 having been reached. This of course opens contact 192 so that cam C cannot send periodic pulses to the timer motor magnet 160. Instead, cam A sends a pulse to operate relay 100 as before, to again register the meter. Also, as before, the timer cycle is begun again when relay 100 closes the first step circuit to magnet 160, said magnet advancing off home one step as relay 100 restores. The cycle then continues, each time period being metered, however long the parties desire to converse. Charge for the call is subsequently made on the basis of the meter periods registered.

When the parties hang up at the end of the call, ground is removed from lead C in the now open line loop circuit. Relay 140 deprived of its holding ground therefrom restores. The called party hanging up restores relay 120 operated on the well-known battery reversal. Relay 140 in restoring prevents cam C from sending further pulses thru contact 143 to the timer and further, at contacts 141 closes an interrupter circuit traced from ground thru contacts 141, interrupter contact 161, contact 193, motor magnet 160 to battery, which steps the timer rapidly to its home position where the interrupter circuit just traced is opened by cam B1 at contact 193. Although the trunk may again be seized before the timer has homed, since the timer restoring circuit cannot be affected until another call is established and answered, the timer has ample time to restore to home.

The above description of a local call can be assumed to have been made during the working day. In particular, this means that the 24 hour cams shown in Fig. 7 are in the positions shown in the drawings, and fast pulses were operating the Fig. 6 cams.

If the call is made during the first or last portion of the day, beyond and outside of the business hour day, cam B3 in Fig. 7 will have its springs operated while the springs of cam A3 are normal. This is because cam A3 is smaller than B3 so that arm 710 is operated by hump 715 only after arm 700 has been operated by 703 and likewise 700 remains operated after 710 is restored. In such a case, metering of local calls is done as before, but because cam B3 is causing slow pulses to be sent thru contact 702 to the motor magnet 665 in Fig. 6, the cams in Fig. 6 send pulses to the conversational timer in Fig. 1 at less frequent intervals so that the latter timers continue longer before metering occurs. Therefore a longer time is given per unit charge or if it is preferred, the rate is decreased per unit time.

Should the call be made during the middle portion of the night period, both cams A3 and B3 have operated arms 710 and 700 respectively. Metering of local calls during this period is prohibited since cam A3 by hump 715 has opened both contacts 711 and 712 so that cams A and C cannot send a ground pulse to the local timer and meter. Even if the call is made but not answered just prior to cam A3 operating arm 710, cam A will operate relay 110 in the usual manner when the called party answers and cam B will later operate relay 140. However, even though relay 140 is operated, the call cannot be metered nor the timer advanced because by this time cam A3 has operated arm 710 to remove the ground source necessary to operate the meter operating relay 100. Therefore, during this period, local calls are not metered at all, but toll calls are as will be described later.

It is also likely that the timer may at times be off home when cam A3 operates its springs. In such a case however, cam A3 prevents transmission of further pulses to the timer motor magnet 160. The timer therefore stops rotating, but even if it were not stopped, additional metering would not occur because cam A3 prevents the sending of a ground pulse to operate relay 100. The local timer automatically returns to normal at the completion of the call via the interrupter circuit previously traced even though it was stopped off-normal by cam A3.

*Short distance toll call*

The following description is of toll call to a subscriber in a nearby exchange made by a subscriber in a similar branch exchange. Therefore, let it be assumed that subscriber X raises his handset completing the line loop in well-known manner. He desires to call another subscriber, such as Z, Z being characteristic of subscribers in another branch exchange and a satellite of the same main exchange, similar to that in Fig. 1. The finder finds the line in the usual manner and when the trunk is seized as described in the local call, ground is placed on the C lead and current flows thru relay 120. Selector 175 is now dialled to the automatic toll level which may be the first or tenth, accessed by dialing "1" or "0." For the purpose of this description, assume further that the toll level is the first level, while "0," accessing the tenth level, is served for special services, or to reach a toll operator for long distance calls. As soon as either "1" or "0" is dialled, here "1" having been dialled, the selector wipers step to the first level and operate the normal post springs closing contact 176. N. P. S. contacts 176 complete an obvious circuit for operating relay 130. At contacts 133 relay 130 disconnects the winding M of relay 120 from the C lead and at contacts 132 short circuits the S winding to prevent operation of relay 120 on short haul toll calls and on calls to the long distant operator. Relay 130 at contacts 131 opens the local meter control circuit to meter relay 100 to prevent operation of meter relay 100. The selector 175 is of the well-known battery searching type so that the wiper having been advanced to the toll level searches thereover for an idle inter-office trunk-repeater-selector link which will be marked by battery. The idle link marking battery is found in the inter-office toll repeater at resistance 345 in Fig. 3 and the selector is stopped from further searching thereby in well-known manner; the circuit, being traced from battery, resistant 345 and thru contacts 344, 324, 314, 303, 286, 268 and 201, lead C, wiper 182 to selector 175.

The line loop is extended by the selector thru to the repeater associated with the idle trunk link selected and line relay 250 is thereby operated. The circuit therefor is traced from ground, thru the lower winding of line relay 250, contact 226*b*, repeating coil winding 344, contact 214, over the +L line, selector wiper 183, back thru the loop including the finder, line circuit and subscribers substation X, returning thru the other side of said loop, thru selector wiper 184, over the −L line, contact 216, repeating coil winding 342, contact 228, upper winding of relay 260 to battery. Line relay 250 operates and closes an obvious circuit to release relay 260 from ground at contact 252. Relay 260 is sleeved and slow-to-release. Relay 260 in operating opens the stopping battery circuit at contact 268 and replaces it with holding ground to the C lead thru contact 267 to hold the preceding equipment operated. At contact 263, relay 260 completes a circuit from ground therethru, contacts 212, 224, relay 230 to battery. Relay 230 operates.

Line relay 250 responds to dial pulses over the loop and alternately deenergizes to close a ground pulse thru contacts 251, 265, thru windings of relays 270 and 280 to battery as well as thru contact 223 thru winding of magnet R to battery. Relays 270, 280 and magnet R operate.

Figure 2:
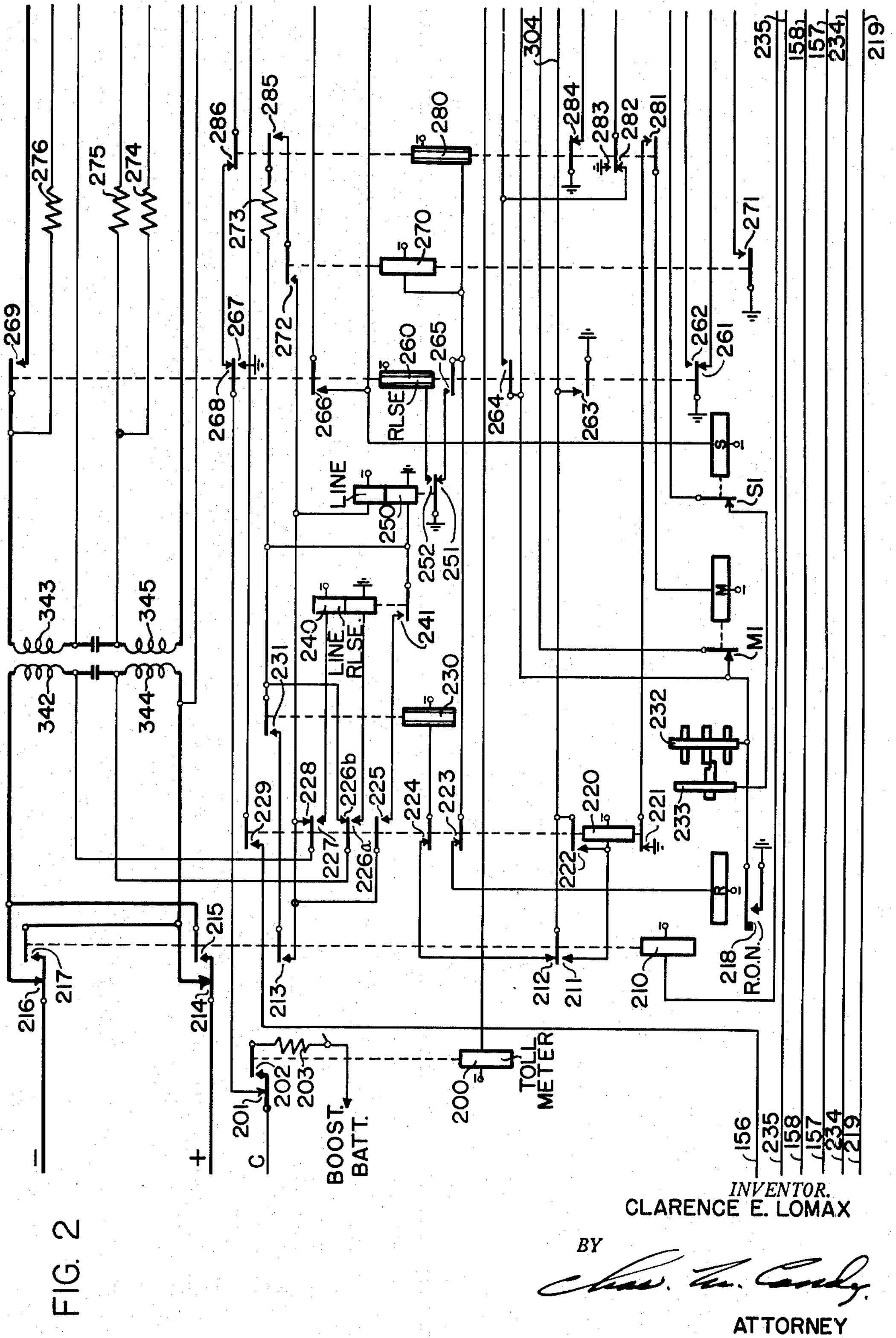
Figure 3:
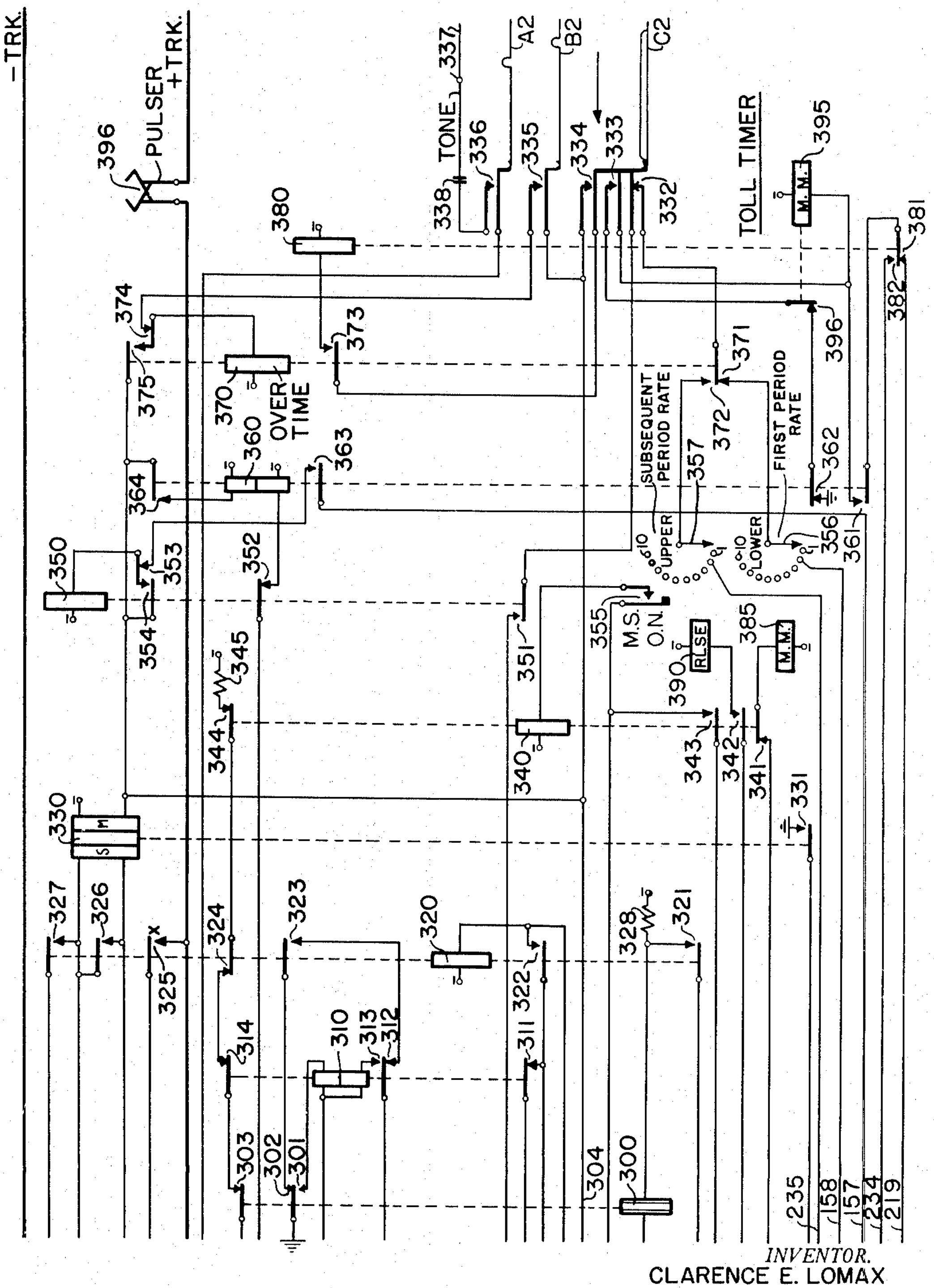

At this point it might be well to point out that magnets R, M, and S as well as the mechanism indicated by reference characters 232 and 233 in Fig. 2 and pulser contacts 396 in Fig. 3 are representative of the operating magnets and mechanism respectively of a mechanical impulse repeater of the type described in United States Patent 2,188,461 issued to McClew and Woodland, January 30, 1940, to which reference may be had for a complete understanding of the mechanism and circuit function of the magnets involved.

Magnet R is the receiving magnet for the mechanical pulser and will respond to dial pulses over a circuit therefor traced thru back contact 251 of line relay 250. Relay 270 likewise responds to dial impulses over the circuit traced hereinbefore, the purpose being to slightly pre-energize line relay 250 after the first pulse thereto. This is to improve pulsing. The pre-energizing circuit is traced from ground thru lower winding of relay 250, resistance 273, contacts 285, 272 and upper winding of relay 250 to battery. Because of resistance 273, the current is insufficient to operate line relay 250 but effects the pre-energization referred to hereinbefore to improve the actual dial pulsing of line relay 250. Such a pre-energizing circuit could likewise be taken thru a make contact on magnet R, not shown, as well. With the improved pulsing due to the pre-energizing circuit along with dial pulses from the mechanical pulses, there is reasonable assurance that the pulses will be properly transmitted even though the line resistance is higher than normal due to a defect or high ringer load.

While the slave relay 270 is responding to the dial pulses it is alternately sending ground pulses thru contacts 271 and 341 to operate motor magnet 385 of the ten point rotary switch in Fig. 3. This switch is of the well-known ten point minor switch type and will not further be described as its operation is well-known in the art.

The minor switch serves to select the charge rate for the toll line called. The second digit corresponds to the particular charge rate. Altho as shown, only ten groups of toll lines can be thusly served, the number could easily be increased and is not without the scope of the invention nor the contemplation of the inventor. The lower bank served by wiper 356 selects the first period change rate while the upper bank served by wiper 357 selects the rate for subsequent overtime periods for the particular base rate corresponding to the subscriber or branch exchange called, indicated by the second digit.

Relay 280, being also sleeved and thereby slow-to-release remains operated thruout the dialing of each digit. Relay 300 is operated by the second digit dialled from battery thru resistance 328 in series therewith but may not necessarily be operated by additional digits. This depends on whether the digit stored by the mechanical pulser has been completely sent or not. Relay 300 will not operate on subsequent digits in series with relay 320 if 320 has shunted resistance 328 at contact 321 and sending magnet S is at normal, unoperated.

Relay 300 closes contact 301 energizing relay 310 in series with magnet S but current is insufficient to operate S in series therewith. The circuit is traced from ground thru contact 301, upper winding of relay 310, contact 266, winding of magnet S to battery.

Relay 280 keeps marking magnet M of the mechanical pulser operated while each digit is being dialled; the circuit therefor traced from ground thru contacts 221 and 281 to battery on magnet M. This is to prevent transmission from the mechanical pulser of stored pulses before an entire digit is stored. As line relay 250 responding to the dial pulses sends equivalent pulses to receiving magnet R, R responds and advances the marking arm 233 of the pulser. The first step of arm 233 closes the R off-normal contact 218. Relay 280 restores after the end of this second digit dialled and releases marking magnet M at contact 281. Relay 320 is thereupon energized, the circuit traceable from ground thru R off-normal contact 218 and contact M1 thru winding of relay 320 to battery.

When the trunk repeater-selector was seized and relay 260 operated, it also closed contact 269 closing a loop circuit thru repeating coil windings 343 and 345 to the line relay of the inter-office trunk selector 400, in the main exchange. The line relay of selector 400 is not shown as the extension of the loop thereto is well-known and old in the art. Selector 400 however, being in the Main exchange allows main exchange battery to be applied on selector 400's line relay thru one side of the trunk line, contact 269, coil 343, left-hand (S) winding of relay 330, resistance 275, coil 345, pulser contacts 396 and the + trunk line back thru the selector line relay's other winding and to ground. The resistance 275 maintains the same current for polar relay 330 of all branch offices as well as the pulsing relays of the toll repeater. The third digit steps wipers 401, 402 and 403 of selector 400 to an idle main exchange toll line repeater, Figs. 4 and 5.

When relay 320 operates at the end of the second digit, it closes contact 326 to shunt the left-hand (S) winding of polar relay 330 as well as partially shunting the trunk side of the repeating coil at contacts 325 and 327. With the (S) winding shunted, the transmission of pulses is improved as well as assuring that relay 330 will not operate prematurely. The repeating coil is only partially shunted so as not to insert too great an impedance in the line when relay 320 finally restores.

Relays 300 and 310 restore after relay 280 restores and 320 operates. Magnet S now operates from ground thru contacts 302, 323, 312 and its winding to battery thereon. The operation of magnet S permits the stored digit to be sent by the mechanical pulser.

Relay 280 in restoring after the end of the second digit also closes ground thru contacts 284 and minor switch off-normal contact 355 thru winding of relay 340 to battery thereon to operate relay 340. In operating, relay 340 closes contact 343 and locks therethru to ground at contact 262 on relay 260. Relay 340 in operating also opens the pulse circuit to the minor switch motor magnet at contact 341 so that it cannot respond to further digits, having already selected the rate of charge to be used and corresponding to the second digit, which as stated before has relation to the particular branch exchange called.

Additional digits are sent over the trunk in the same manner as the second digit. Relay 320 may or may not restore between digits dependent upon whether or not there is a complete digit in storage after a digit has been sent; and as stated hereinbefore, whether or not relay 300 operates in response to each subsequent digit is dependent upon the relative speed of storing and sending digits. These subsequent digits are repeated in the main exchange toll repeater (Figs. 4–5) and again repeated in a local toll repeater 585 which will be the same as that shown in Figs. 4–5 except that it is at the nearby branch exchange. These repeated impulses step local selectors and connectors such as 590 and 595 to complete the call to subscriber Z.

Figure 4:
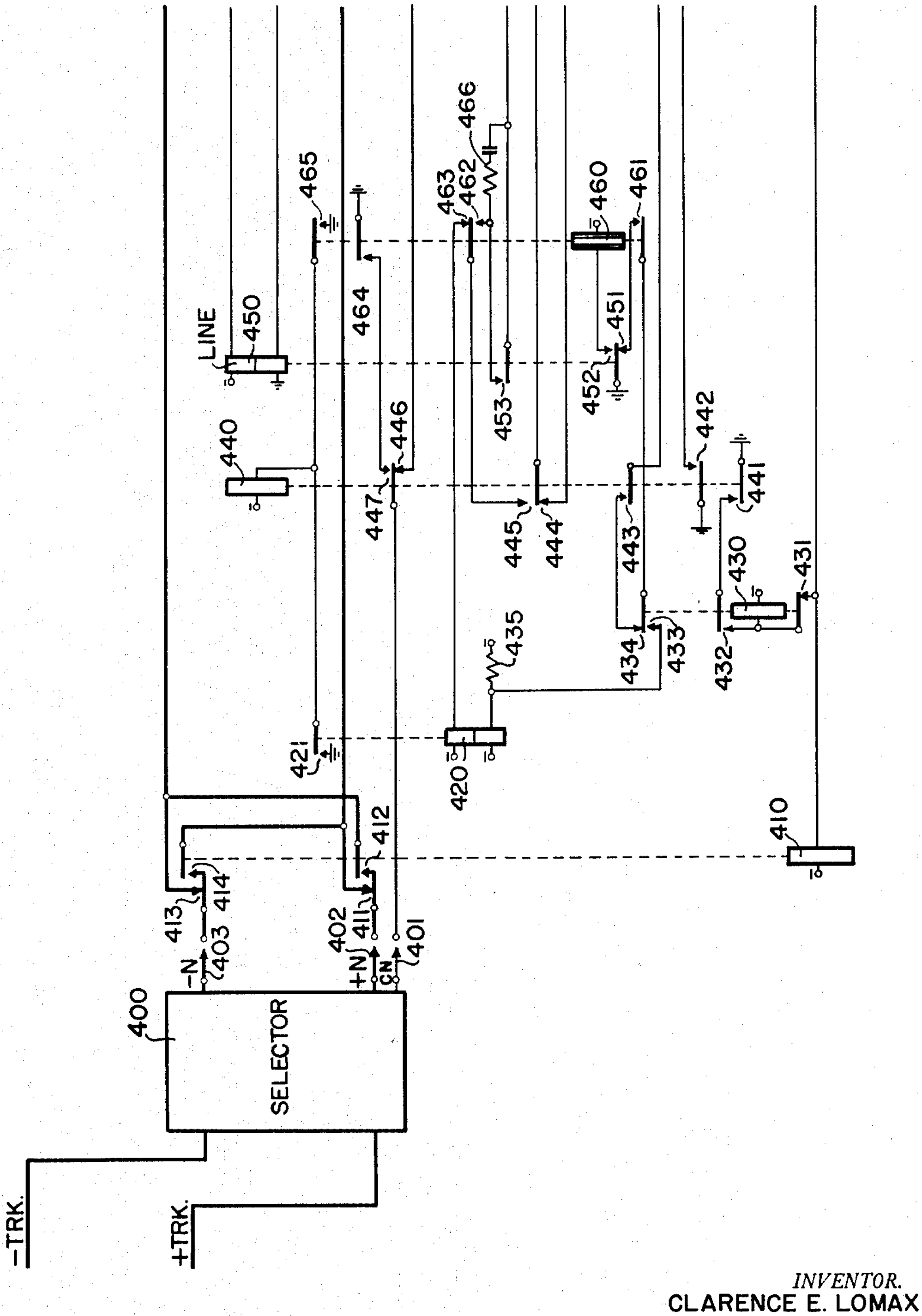
Figs. 4 and 5 show a selector and short haul two-way toll line repeater.
Figure 5:
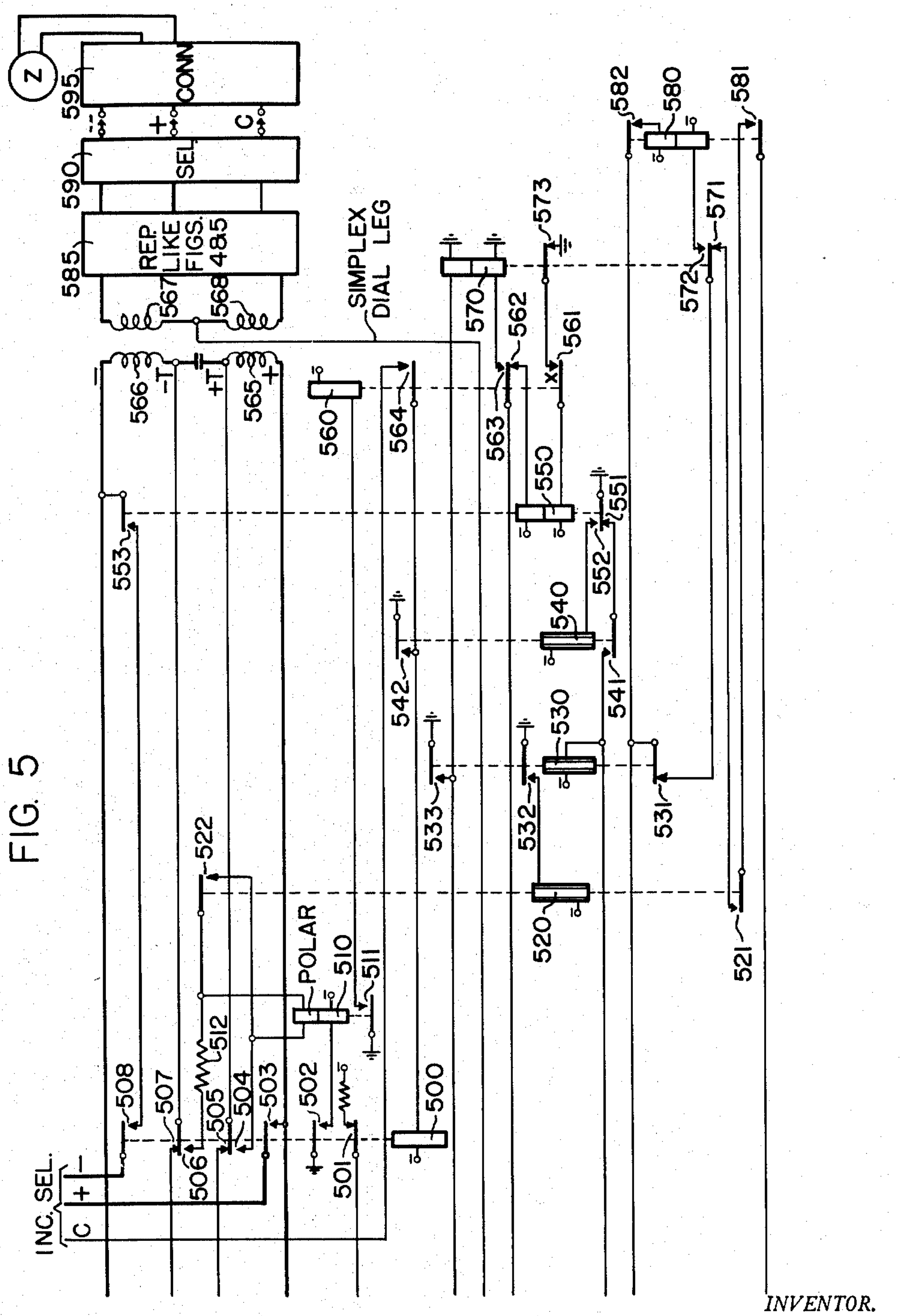

Since the local incoming repeater at the remote branch exchange is just like that shown in Figs. 4–5 it is not again shown other than at block diagram 585. However, it must be remembered that it is connected to the repeater in Figs. 4–5 at the repeating coil windings 567 and 568 as a reverse image thereof so that tracing a circuit thereinto from Figs. 4–5 will read almost as the reverse of the circuit from Figs. 4–5. Since the relays and their functions are similar, relays in the remote repeater will be referred to as corresponding to the like relay in the main exchange repeater.

The operation of the main exchange and remote branch repeaters responsive to subsequent digits dialled will now be detailed in the completion of the toll call.

Returning now to the point where the second digit dialled stepped selector 400 in the main exchange to the desired level, the wipers 401, 402 and 403 thereof connect with an idle toll line-repeater in the desired group. When the idle toll line is found, the loop is extended to the windings of the line relay 450, the circuit being traced from ground thru the lower winding of relay 450, contact 505, repeating coil winding 565, contact 411, wiper 402, and back thru the previously traced loop extending to selector 400, and back over the other side of the loop thru wiper 403, contact 413, repeating coil winding 566, contact 507 and upper winding of line relay 450 to battery. Relay 450 in operating closes contact 452 and ground therethru to operate relay 460. Relay 460 in operating closes ground thru contact 465 and winding of relay 440 to battery thereon causing relay 440 to operate.

The toll line, as was previously stated, between the main office and the remote branch being called has another repeater like that in Fig. 4–5 at the distant branch exchange end thereof and the distant branch exchange repeater in turn is connected to a selector and connector to complete the call thru to subscriber Z. Normally, the two like repeaters, the one at the main exchange and the one at the remote branch exchange have the upper windings of their respective relays 550 in series with one another. This series circuit is traced from battery thru upper winding of relay 550, contact 562, contact 444 over the simplex dial leg, repeating coil winding 567 to the repeating coil winding in repeater 585 corresponding to coil 567 and therethru in reverse fashion to the contacts corresponding to 444 and 562 and the upper winding of distant branch exchange relay 550 to battery. As both relays are connected to battery under normal conditions either is operated at this time. However, since it was stated that relay 450, 460 and 440 were operated when the repeater (Figs. 4–5) was seized by selector 400, the relay corresponding to relay 550 at the distant branch repeater is in series now with the upper winding of relay 570 in Fig. 5. This circuit is traced from ground thru upper winding of the relay 570 thru contacts 453, 462, 445 and out over the simplex dial leg thru repeating coil winding 567 and into repeater 585 thru the winding corresponding to winding 567 and the contacts corresponding to the contacts 444 and 562 thru the upper winding of the relay corresponding to 550 and to battery thereon. In this maner, relay 570 in the main exchange repeater is operated in series with the relay corresponding to relay 550 in the remote branch exchange repeater. Relay 570 in operating closes contact 572 so that a circuit is closed from ground thru contacts 442, 531 and 572 thru lower winding of relay 580 to battery. Relay 580 operates and locks to the ground at contacts 442 thru its contact 582. Meanwhile, the relay corresponding to relay 550 at the remote branch repeater causes relays corresponding to 540 and 500 to operate. The circuit for operating the relay corresponding to relay 540 is obviously from the ground thru the contact corresponding to 552. The relay corresponding to 540 operating closes ground thru the contact corresponding to 542 to operate the relay crresponding to 500. The relay corresponding to 500 at the distant branch repeater closes contacts corresponding to 508 and 503 to connect the repeater to a selector such as 590 and connector 595 to complete the call. The remaining digits are now sent thru by the mechanical repeater and repeated at the main exchange repeater as well as the remote branch repeater to operate selector 590 which selects to connector 595 to connect and ring subscriber Z with the remaining two digits in well-known manner.

When subscriber Z at the distant office answers the call he reverses the battery in the connector 595 in well-known manner causing a relay corresponding to relay 510, which is a polar relay and poled to operate on battery reversal, to energize. This in turn closes ground thru a contact corresponding to 511 to flow thru a relay corresponding to 560 at the remote exchange and to battery thereon. The relay corresponding to 560 at the distant exchange energizes, closing the contact corresponding to 563 so that the relay corresponding to 570 at the distant exchange is in series thru its lower winding with the upper winding of relay 570 at the main exchange. The circuit therefor is traced from ground thru the lower winding of the relay corresponding to relay 570 at the distant exchange thru contacts corresponding to 563, 444 and a winding of the repeating coil corresponding to 567, back thru winding 567, thru contacts 445, 462 and 453 in the main exchange, thru upper winding of relay 570 to ground. As the windings of relay 570 and its counter-part in the distant exchange are both connected to ground, relay 570 at the main exchange restores. Relay 570 in restoring closes contact 571 to operate relays 410 and 430. The circuits therefor are traced from ground thru contacts 442, 531, 571, 521, 581, thru winding of relay 410 to battery and thru contact 431 and winding of relay 430 to battery. Relay 430 in operating closes contact 432 to lock to ground on contact 441. Relay 410 in operating opens contacts 411 and 413 and closes contacts 412 and 414, thereby reversing battery back to the branch office originating the call to start the timing for charge purposes.

Also, when the called party answers and battery is reversed back over the loop from the main exchange repeater, polar relay 330 previously unoperated because of its polarity to the direction of current pulse now operates. In operating, the relay 330 closes ground thru contact 331 and winding of relay 210 to battery thereon. Relay 210 energizes and closes contact 211 to operate relay 220, the circuit being traced from ground thru contacts 263, 211 and winding of relay 220 to battery. Relay 220 closes its contact 222 and locks to ground thru contact 263 independent of relay 210. Relay 210 in operating closes contacts 215 and 217 to reverse the battery back thru the talking loop for purposes of supervision in case the call had been set up from a manual board and also shunts the line relay 250 at now closed contact 213. Relay 220 in operating also opens contacts **226*b* and 228 and closes contacts 226*a* and 227 to transfer the line leads thru repeating coil windings 342 and 344 from line relay 250 to line release relay 240. Line release relay 240 operates before sleeved slow-to-release relay 230 releases due to the latter relay's circuit now being opened at contact 224 by relay 220. Line release relay 240 in operating closes contact 241 to hold line relay 250 operated; the circuit being traced from ground thru the lower winding of relays 240, 241, 225 and thru the upper winding of relay 250 thru battery. In this manner line relay 250 can no longer restore even though the called party effected a restoration of polar relay 330 and relay 210 by hanging up. When relay 220 operated and locked to ground thru contact 263, and in closing the line transfer circuit thru contacts 226***a* and 227 to line release relay 240 it effected the positioning of line release relay 240 to control the release of the switch train even though relay 240 is of lower resistance than line relay 250 and is actually not suitable for pulsing. Furthermore, relay 240 being of lower resistance furnishes more current to the transmitter. Relay 220 in operating also at contacts 223 and 221 respectively, opens the operating circuits for receiving magnet R and marking magnet M of the mechanical pulser so that the mechanical pulser may not respond to any more digits which may be dialled or to a false pulsing occurring thru the releasing of various relays. Relay 230 ultimately restores and because its operating circuit is opened at contact 224 cannot reoperate upon release. This is a precautionary measure in the event that the calling party should hang up and the called party should for some reason fail to reciprocate shortly thereafter. And finally, at contact 229 relay 220 closes a circuit to permit cam E of Fig. 6 to operate relay 360. The circuit is traced from ground on arm 670 raised by hump 672 of cam E into contact with contact 671 over conductor 156, thru contacts 229, 352 and lower winding of relay 360 to battery. Relay 360 energizes and in operating closes its locking contact 364 to lock its upper winding therethru to ground at contact 263. Shortly after this pulse by way of cam E, cam D thru hump 677 operates arm 675 into contact with contact 676 closing the common ground on the cam arm thru contact 676 over conductor 157, contacts 363 and 353 and thru winding of relay 350 to battery thereon. Relay 350 energizes and locks to ground on contact 263 thru contact 354, opening its energizing circuit at contact 353. In case the second digit dialled had been the digit 2, which must be assumed corresponds to the toll area in which subscriber Z is located and had therefore stepped the minor switch wipers 356 and 357 to position 2, very shortly after relay 350 operates, cam J thru humps 632—635 will send four ground pulses from the common ground source on the operating arm, here particularly thru arm 630 and contact 631, contact 713 in Fig. 7, over conductor 158 to the lower bank contact number 2 of the minor switch, thru wiper 356 serving said bank and positioned thereon, thru contacts 371, 332, 351 and winding of toll meter relay 200 to battery. This alternately energizes and deenergizes toll meter relay 200 to send four booster battery pulses thru resistance 203 and contact 202 over the C lead thru selector wiper 182 and thru contact 102 and right-hand operate winding of meter 150 to exchange battery to operate the meter 150. The initial time period is therefore charged at the rate of four units. Immediately, after cam J sends each of the four ground pulses to apply booster battery to the meter for registering the initial time period charge, cam L closes an equal number of ground pulses thru arm 600 and contact 601 and contact 151 over conductor 159 to battery on the oppositely wound left-hand winding of meter 150. The meter is so differentially wound that the pulses of reverse current from cam L thru the operated meter forces it to restore quickly even though it is getting current thru its right-hand operate winding from the battery. After the cams in Fig. 6 have sent all of the metering pulses cam C by way of hump 683 operates arm 680 into engagement with contact 681 to send a ground pulse therethru and over conductor 219, thru contacts 381 and 361 thru the winding of the toll timer motor magnet 395 in Fig. 3 to battery thereon. This motor magnet operates cams of a toll conversational timer similar to that operated by motor magnet 160 in Fig. 1 for local calls. The toll timer operated by motor magnet 395 is of the type which advances by way of a retractile spring, not shown, when its circuit is opened and the result is that it takes one step as soon as the hump 683 of cam C has allowed arm 680 to restore after the pulse. On the first step, the elongated hump on cam C2 of the toll conversational timer in Fig. 3 operates its springs to open contact 332 and close contacts 333 and 334. Cam C in Fig. 6 continues to send one pulse to the toll conversational timer motor magnet 395 for each revolution of the cams to keep the toll conversational timer cams of Fig. 3 advancing. It will be remembered that the cams in Fig. 6 are continuously advancing from either the fast or slow ground pulse source in Fig. 7 thru contacts 701 or 702 respectively for operating motor magnet 665. If the conversation continues sufficiently long, the toll timer of motor magnet 395 will have advanced the hump on cam A2 to operate its arm and close contact 336. This will send a momentary tone from tone source 337 thru condenser 338 and thru contact 336 out onto the +L line back thru the line loop to warn the caller that the initial time period is about to expire and that if the conversation is not shortly terminated, another charge will be recorded. If the call is not disconnected shortly after this warning, cam B2, which it will be noted slightly lags cam A2, a short time later, say for example ten seconds, will close contact 335 to operate relay 370; the circuit being traced from ground thru contacts 263, conductor 304, contacts 335 and 374 thru winding of relay 370 to battery. Relay 370 then closes its own contact 375 and locks to ground thru it on contact 263 meanwhile opening its energizing circuit at contact 374. Relay 370 operates just after the pulse from cam C to the motor magnet is removed. The toll timer in Fig. 3 is also of the type which at normal or resting position has the contact 335 of cam B2 operated at the termination of the pulse coming from cam C. Relay 370 being operated permits cam C2 thru closed contact 334 to operate relay 380; the circuit therefor being traced from ground at contact 263 over ground conductor 304 and thru contacts 334 and 373; thru winding of relay 380 to battery. Relay 380 in operating shifts the pulsing circuit for toll timer motor magnet 395 from cam C to cam F by the opening of contact 381 and the closing of contact 382. A ground pulse will now be sent when cam F closes contact 661 to send the ground pulse therethru over conductor 234, thru contacts 382, 361 and winding of motor magnet 395 to battery. This pulse from F advances the timer to its home position so that the springs of cams B2 and C2 restore and relay 380 releases. The cams of Fig. 6 are such as to reach their home position just ahead of the cams in the toll conversational timer in Fig. 3. Since only a very minute interval exists between their returning to their respective home positions, both the cams in Fig. 6 and in Fig. 3 are now home. The meter pulse cams of Fig. 6 continue to advance from the pulsating source in Fig. 7 so that cam K now sends two pulses thru contact 621 and over conductor 235 to the number 2 bank contact of the upper bank of the minor switch in Fig. 3 and thru wiper 357, thru contact 372 now closed since the first charge period has elapsed and overtime relay 370 is energized and therethru to contact 332 of cam C2 now at its home position, thence to contact 351, thru winding of relay 200 to battery. Toll meter relay 200 quickly energizes and deenergizes two times to send two pulses of booster battery current thru resistance 203 and contact 202 onto the C lead thru selector 175 and contact 102 thru the right-hand operate winding of meter 150 to exchange battery to register two units on the meter for the first overtime charge period. Therefore, it is seen that although cam J effected the registration of four units on the meter for the initial time period, cam K effected the registration of only two units for the second time period or first overtime period. The operation of overtime relay 370 is then responsible for the registration of the reduced number of units. After the meter registration pulses are sent, cam C in Fig. 6 again sends its single pulse to the toll conversational timer in Fig. 3 to cause it to advance one step as it did before at the beginning of the initial time period. This first step results in cam C2 operating its springs so that relay 380 is reoperated. The circuit therefor is traced from ground at contact 263 over the ground conductor 304 thru contact 334 of cam C2 and contact 373 thru the winding of relay 380 to battery. With relay 380 again operated, cam F by the second hump 663 sends another pulse to the toll timer motor magnet 395 to advance it another step. The next revolution of the cams in Fig. 6 causes cam F to send two pulses to the timer motor magnet 395 so that the second and all subsequent overtime periods are only half as long as the initial conversational time period. By this manipulation of the number of humps, both the charge rate and/or the time periods may be adjusted to effect differing rates or time periods for overtime conversations.

When the conversation has been completed, should the called party at the distant branch exchange hang up, the relays corresponding to relay 510 and the relay corresponding to relay 560 in the remote branch repeater will restore. This will place the relay corresponding to relay 550 at the remote exchange to be in series with relay 570 at the main exchange; the circuit for which was described hereinbefore under the normal conditions for the two repeaters, namely that in Fig. 5 and its counterpart in the distant exchange, before the called party had answered. Relay 570 will now operate as described in that connection hereinbefore and in so doing opens contact 571 in the operating circuit of relay 410 causing relay 410 to restore. Relay 410 in restoring cuts off the reversal of battery which had occurred thru contacts 412 and 413 so that polar relay 330 in Fig. 3 restores. Relay 430, however, remains operated thru its locking circuit previously traced. The calling party in subsequently hanging up, opens the line loop to restore line release relay 240 and line relay 250. Release relay 260 restores shortly after relay 250 to restore relays 220, 350, 360, 370 and 380 and to operate the release magnet 390 to restore minor switch MS to normal which at ON springs 355 restores relay 340 to stop the metering of the call. Relay 360 at contacts 362 completes a self-interrupted circuit to toll timer stepping magnet 395 to restore the timer to normal. Release relay 260 at contacts 269 opens the trunk line loop to restore line relay 450. This in turn operates realy 420; the circuit therefor being traced from ground thru contacts 451, 461, 433 and lower winding of relay 420 to battery. Contact 461 in the operating circuit remains closed sufficiently long for relay 420 to operate because relay 460 which is sleeved and slow-to-release. Relay 460 later restores and opens the circuit to the lower winding of relay 420, but in restoring, thru contact 463 it closes the upper winding of relay 420 thru contacts 463 and 455 over the simplex dial leg to the right-hand side of the repeating coil and therethru out over the line. If the answering party only has hung up, relay 420 at the main exchange will be in series with the relay corresponding to relay 550 at the distant branch exchange and since both them are connected to battery, relay 420, will restore. However, if the calling party is the first to hang up relay 420 at the main exchange will be in series with the relay corresponding to 570 at the distant exchange so as to keep the trunk busy at the main exchange until the called party hangs up.

The repeater in Fig. 5 and its counterpart at the remote branch are two-way repeaters so that calls could be similarly initiated at the remote branch exchange to reach subscribers in other branch exchanges as well. For simplicity, the switch train has been only drawn in one direction and therefore, switches positioned in the proper direction are necessary, and well-known in the art, in order to switch such a call thru in the other direction.

Long distance toll calls are made by dialing "0" as the initial digit. This steps selector 175 to the tenth level where it will connect to a long distance toll operator. She then will complete the call in well-known manner. Normal post springs 176 operate on the tenth level as well as the first level to prevent the operation of the local call meter as described in the short distance directly dialled toll call.

Having described my invention in detail what I claim and desire to be protected by issuance of Letters Patent of the United States is:

1. In an automatic telephone system, a plurality of exchanges located in different zones, means for connecting a calling subscriber in one exchange with called subscribers in any of said exchanges, a meter for assessing charges for calls, timers in each of said exchanges, one timer operating said meter to assess local calls within the same zone, the other timer variably operating said meter a different number of times in accordance with each different zone called to assess calls between any of said exchanges in said different zones, common means in each exchange for operating said timers in their respective exchanges, and means for variably operating said common means in accordance with different times of the day to thereby variably control the operation of said timers for varying the charge in accordance with the time of day.

2. In an automatic telephone system, a plurality of exchanges, means for connecting a calling subscriber in one exchange with called subscribers in any of said exchanges, a meter for assessing charges for said connections, a local call timer mechanism, a toll call timer mechanism, each of said timers operable to register said meter after a predetermined elapsed connection time period, common rotating means for advancing either one of said timers responsive to the completion of a call of its respective type, and another rotating means controlling said common means for varying the rate of advancement of said timers in accordance with the time of day.

3. In an automatic telephone system as claimed in claim 2, said last mentioned means including a rotating cam for nullifying the advancement of said local call timer by said common means during a predetermined portion of the day whereby during said predetermined portion of the day, local connections are unmetered.

4. In an automatic telephone system, a plurality of exchanges, means for connecting a calling subscriber in one exchange with called subscribers in any of said exchanges, a meter for assessing charges for calls, a local call timer and a toll timer operating said meter after predetermined timed periods for local and toll calls respectively, means common to said timers for operating them, said common means operating said local timer to cause the same charge to be registered for successive time periods, and a relay for changing the operating control of said common means over said toll timer so that said toll timer registers a different charge for successive toll time periods.

5. In an automatic telephone system as claimed in claim 4, additional means also controlling said common means for varying all of said charges in accordance with the time of day.

6. In an automatic telephone system, a plurality of exchanges, means for connecting a calling subscriber in one exchange with called subscribers in any of said exchanges, a local call timer and a toll call timer, a meter operable by said timers after predetermined elapsed time periods for assessing call charges on local and toll calls, common rotating means for advancing said timers during calls, control means for governing the rate of rotation of said common means in accordance with the time of day, said control means including a cam for nullifying said timer advancing means for local calls during a particular predetermined time of day, another means for operating the meter and starting the advancement of said local call timer by said common rotating means responsive to the completion of a local connection, and circuit means effective during toll connections for nullifying said starting means for said local timer whether or not said cam is effective in its purpose.

7. In an automatic telephone system, a plurality of exchanges, means for connecting a calling subscriber in one exchange with called subscribers in any of said exchanges, a local call timer and a toll call timer, a meter operable by either of said timers after predetermined elapsed time periods for assessing respective call charges, common rotating means including a plurality of cams, circuits controlled by said cams for advancing said timers during calls, control means governing the rate of rotation of said common rotating means in accordance with the time of day, another means including a polar relay in series with one side of said connection operable responsive to the completion of a local connection for preparing an operating circuit for said meter and for preparing a starting circuit for advancing said local timer one step under control of said cams, means controlled by said cams for completing said meter circuit and for completing said local timer starting circuit, said control means including a cam for opening said local timer starting and advancing circuits during a particular predetermined time of day as well as for opening said meter circuit to prevent operation of said meter.

8. In an automatic telephone system as claimed in claim 7, another circuit for shunting said polar relay, and means including normal post springs operable responsive to dialing of other than a local call for closing said last mentioned circuit to shunt said polar relay to improve transmission and prevent advancement of said local timer.

9. In an automatic telephone system, a plurality of exchanges, means for connecting a calling subscriber in one exchange with called subscribers in any of said exchanges, a meter for assessing charges for calls, timers in each of said exchanges, one timer for operating said meter to assess local calls, the other timer for operating said meter to assess calls between any of said exchanges, means for operating said timers, said meter having differentially wound coils, a high potential current source, circuit means operated responsive to the operation of said timers for transmitting pulses of current from said high potential current source to the operate coil of said meter to assess said calls, another current source, and additional circuit means for transmitting at substantially the same time in an equal number of pulses of current from said other source to the other coil of said meter for causing said meter to quickly restore immediately upon termination of each pulse to the operate coil of said meter to assess said calls.

10. In a telephone system, a plurality of exchanges, means for connecting a calling subscriber in one of said exchanges with called subscribers in the other exchanges, charge assessing mechanism including a timer in each exchange operating automatically during such connections to assess periodic elapsed time charges against the calling subscriber, means for varying the amount of said periodic charges assessed during the connections in accordance with the exchange in which the called subscriber is located, means for operating said timer at one speed to assess the charge for the initial elapsed time period, means for operating said timer at a different speed to assess the charge for the successive elapsed time periods, and further means for operating said timer at another speed in accordance with the time of day to vary both the initial elapsed time period and the successive elapsed time periods.

11. In a telephone system, a plurality of exchanges, means for connecting a calling subscriber in one of said exchanges with called subscribers in the other exchanges, charge assessing mechanism including a timer in each exchange operated automatically during such connections to assess an initial time charge for an initial time period and subsequent successive periodic elapsed time charges for overtime periods for each call against the calling subscriber, means for varying the amount of said initial time charge and the amount of said successive elapsed time charges during the connection in accordance with the exchange in which the called subscriber is located, a first means in said mechanism for operating said timer at one speed during the initial time period to assess the charge for the initial time period, a second means in said mechanism for operating said timer at a different speed during the successive elapsed time periods to assess the charge for the successive elapsed time charges, means operated by said timer at the end of the initial time period for switching the operating control of said timer from said first means to said second means, and further means for changing the speed of operation of said mechanism in accordance with the time of day to cause said first and second means of said mechanism to operate said timer to vary both the said initial time period and the successive elapsed time periods.

12. In a telephone system, a plurality of exchanges, means for connecting a calling subscriber in one of said exchanges with called subscribers in the other exchanges, means including a cyclic operated timer for assessing an initial time charge for an initial time period and for assessing overtime charges for each overtime period, means for operating said timer for one cycle operation at one speed to assess an initial time period charge, means for operating said timer at a different speed to assess an overtime period charge for each cyclic operation, and means for operating said timer at a third different speed dependent upon the time of day a connection is completed between said calling line and a called line to vary the time duration of the cyclic operations for said initial time periods and said overtime periods.

13. In a telephone system, a plurality of exchanges, means for connecting a calling subscriber in one of said exchanges with called subscribers in the other exchanges, charge assessing mechanism in each exchange for assessing an initial time charge for an initial time period and for assessing overtime charges for each overtime period for each call against said calling subscriber, a cyclic operated timer having a driving means, a first means in said mechanism effective during the initial time period for operating said driving means at one speed through a first cycle of operation, a second means in said mechanism effective during the overtime periods for operating said driving means at a different speed through successive cyclic operations, means operated by said timer at the end of said initial time period for switching the operating control of said driving means from said first means to said second means whereby said initial time periods are of different time duration than said overtime periods, means for assessing the corresponding charge against said calling subscriber at each cyclic operation of said timer, and means for operating said mechanism at one speed during the day time and at a different speed during the night time thereby causing said first and second means in said mechanism to operate said driving means to vary the time duration of said initial period and the time duration of said overtime period in accordance with the time of day.

References Cited in the file of this patent

UNITED STATES PATENTS

| | | |
|---|---|---|
| 1,119,915 | Williams | Dec. 8, 1914 |
| 1,532,241 | Flad | Apr. 7, 1925 |
| 1,944,704 | Bellamy | Jan. 23, 1934 |
| 2,073,756 | Osten-Sacken | Mar. 16, 1937 |
| 2,094,060 | Busch | Sept. 28, 1937 |
| 2,188,461 | McClew | Jan. 30, 1940 |
| 2,225,386 | Hebel | Dec. 17, 1940 |
| 2,232,181 | McClew | Feb. 18, 1941 |
| 2,250,735 | Topfer | July 29, 1941 |
| 2,282,975 | Lurk et al. | May 12, 1942 |
| 2,543,022 | Horwitz | Feb. 28, 1951 |
| 2,546,605 | Lomax | Mar. 27, 1951 |
| 2,566,330 | Horwitz | Sept. 4, 1951 |
| 2,567,209 | Horwitz | Sept. 11, 1951 |